United States Patent
Ohki et al.

(10) Patent No.: US 9,811,187 B2
(45) Date of Patent: Nov. 7, 2017

(54) INFORMATION PROCESSING APPARATUS, INFORMATION PROCESSING METHOD, AND PROGRAM

(75) Inventors: Yoshihito Ohki, Tokyo (JP); Tomoya Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 2049 days.

(21) Appl. No.: 12/719,617

(22) Filed: Mar. 8, 2010

(65) Prior Publication Data
US 2010/0238107 A1    Sep. 23, 2010

(30) Foreign Application Priority Data
Mar. 19, 2009 (JP) ............................... P2009-068620

(51) Int. Cl.
G09G 5/00 (2006.01)
G06F 3/041 (2006.01)
G06F 3/0488 (2013.01)

(52) U.S. Cl.
CPC .......... G06F 3/0412 (2013.01); G06F 3/0488 (2013.01)

(58) Field of Classification Search
CPC ............................ G06F 3/0412; G06F 3/0488
USPC ................................. 345/156, 173, 174, 175
See application file for complete search history.

(56) References Cited

U.S. PATENT DOCUMENTS

2005/0166162 A1* 7/2005 Kaneko .................. 715/856
2007/0075985 A1* 4/2007 Niida .................... 345/173

FOREIGN PATENT DOCUMENTS

| JP | 04-333912 | 11/1992 |
|---|---|---|
| JP | 2005-31799 | 2/2005 |
| JP | 2005-346507 | 12/2005 |
| JP | 2006-236143 | 9/2006 |

OTHER PUBLICATIONS

Dec. 18, 2012, Japanese Office Action for JP 2009-068620.

* cited by examiner

*Primary Examiner* — Insa Sadio
(74) *Attorney, Agent, or Firm* — Paratus Law Group, PLLC

(57) ABSTRACT

There is provided an information processing apparatus, including: a display panel for displaying at least one object in a selected state or in unselected state; a detection area setting unit for setting, per object on the display panel, a first detection area covering a display area of the object and a second detection area covering the first detection area and being larger than the first detection area; an operating tool detecting unit for detecting an operating tool which is in proximity to the display panel; and a state managing unit for changing the object into the selected state when the operating tool is detected within the first detection area of the object in the unselected state, and for changing the object into the unselected state when the operating tool is not detected within the second detection area of the object in the selected state.

18 Claims, 14 Drawing Sheets

FIG.4
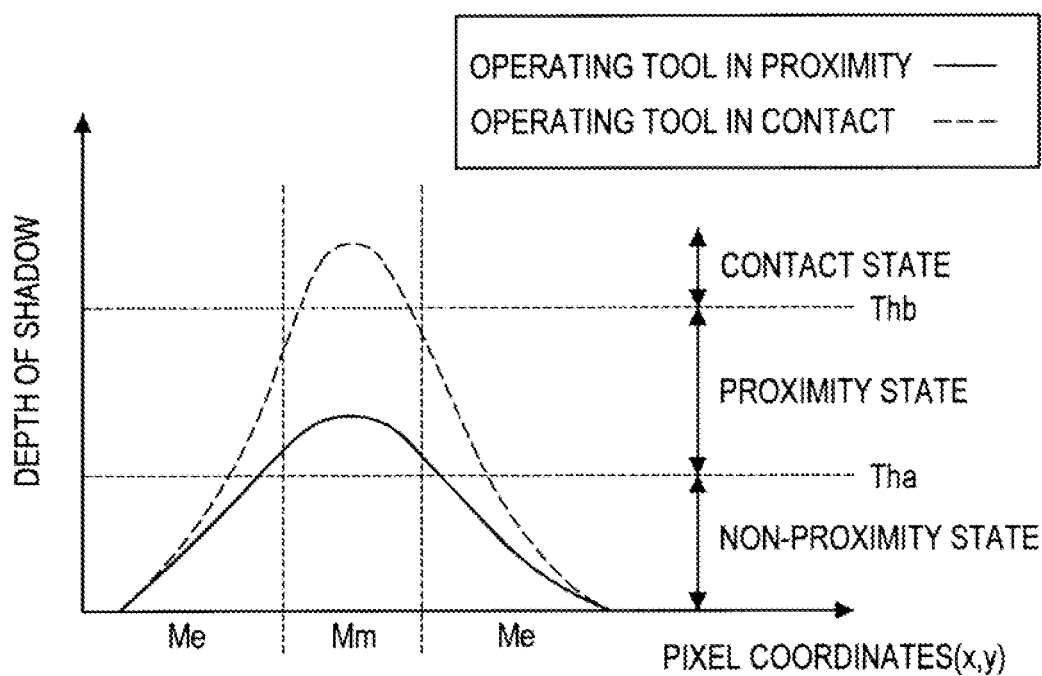
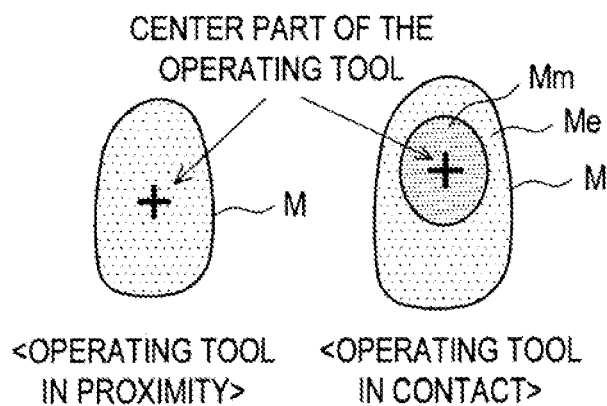

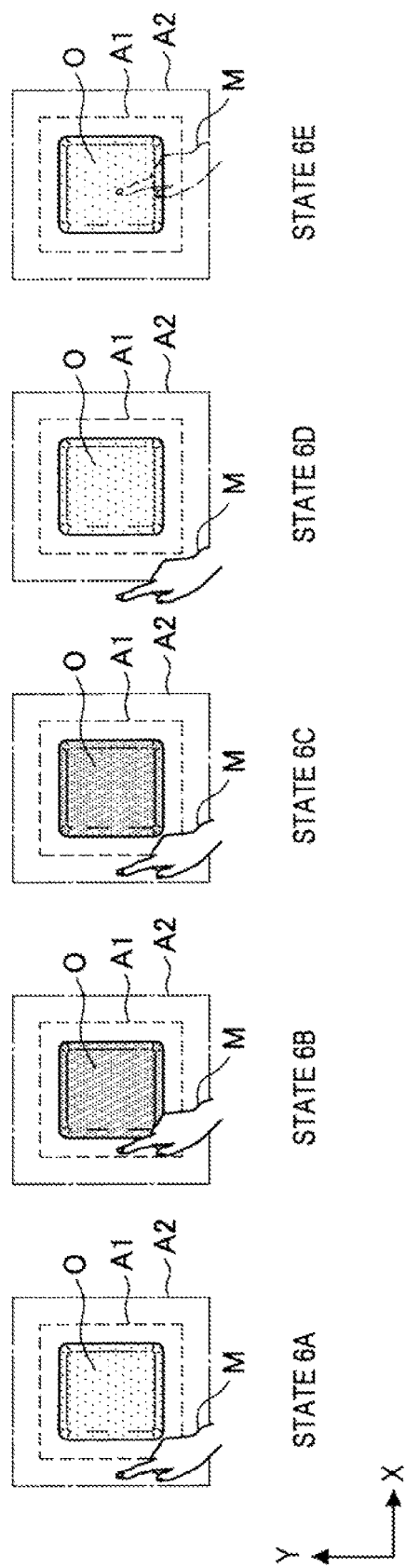

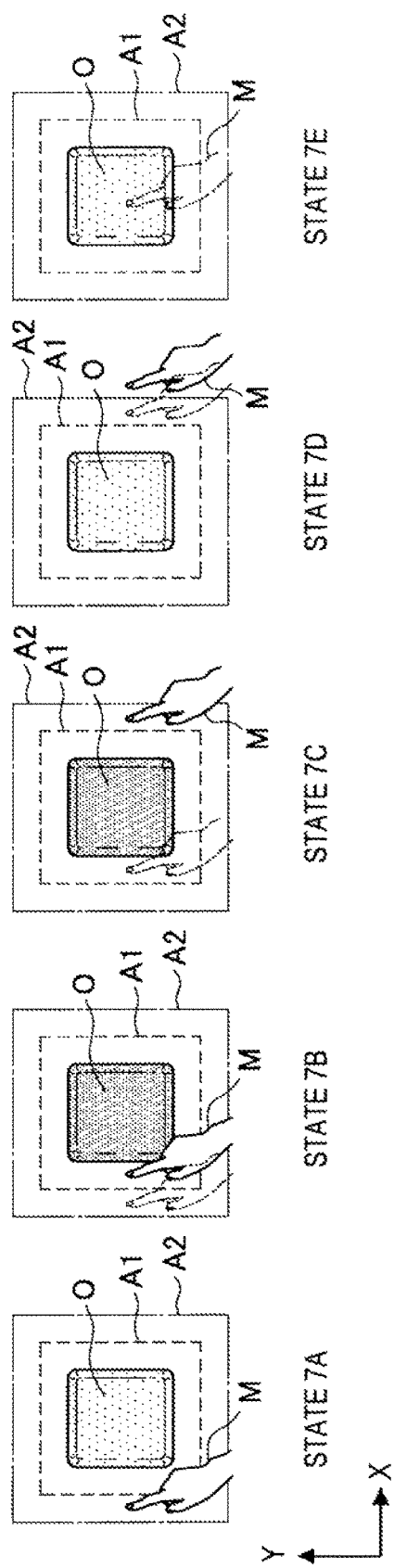

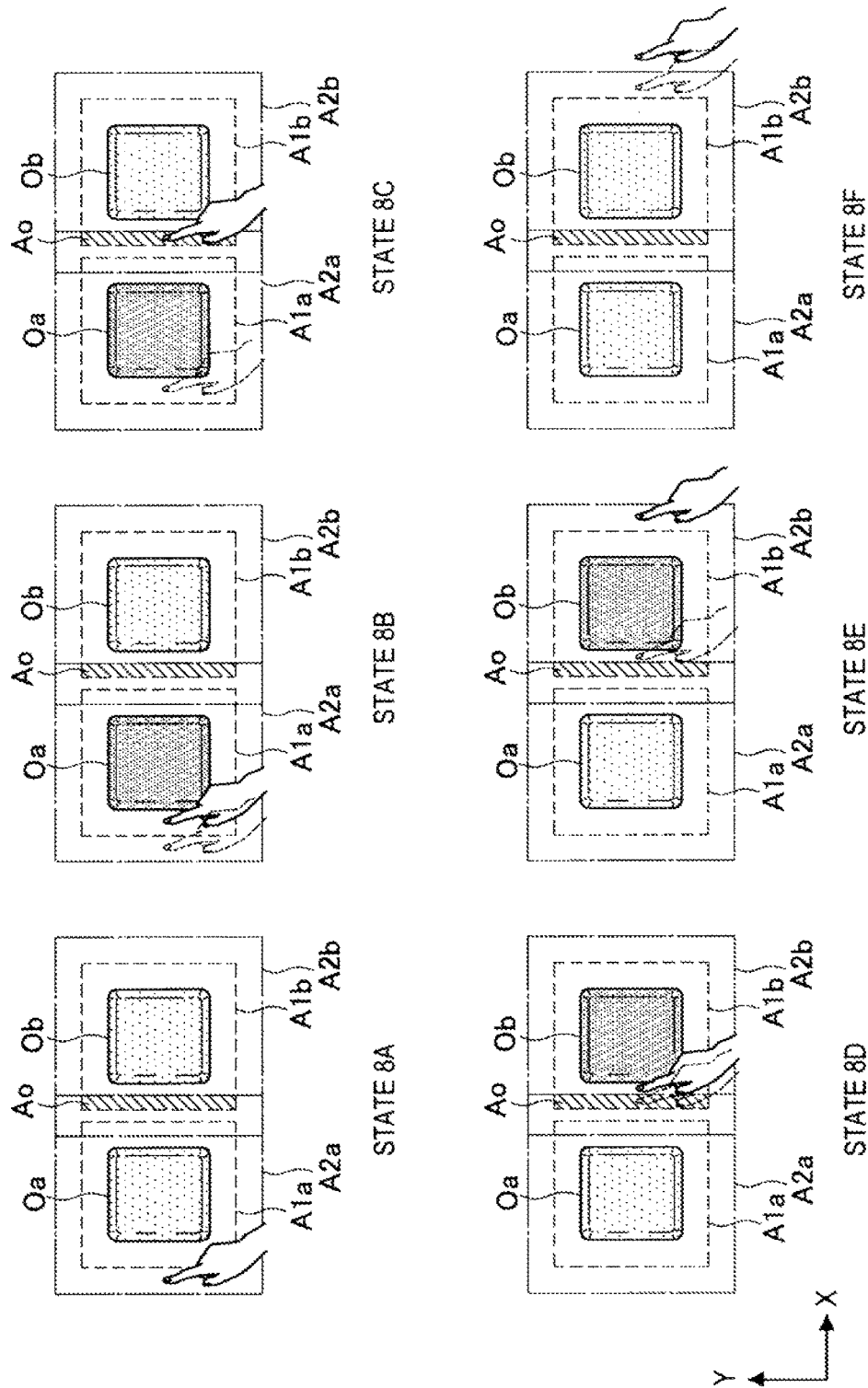

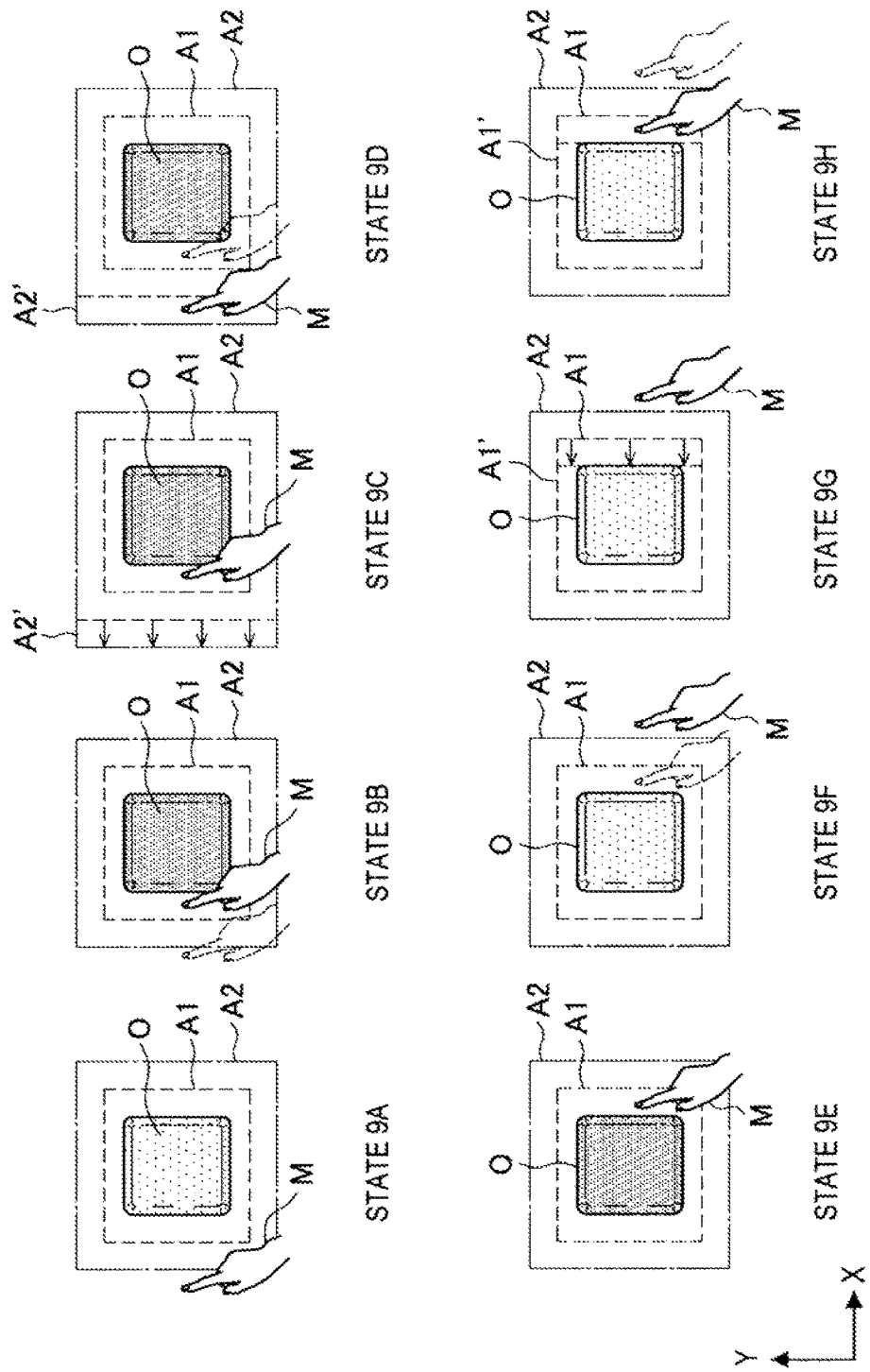

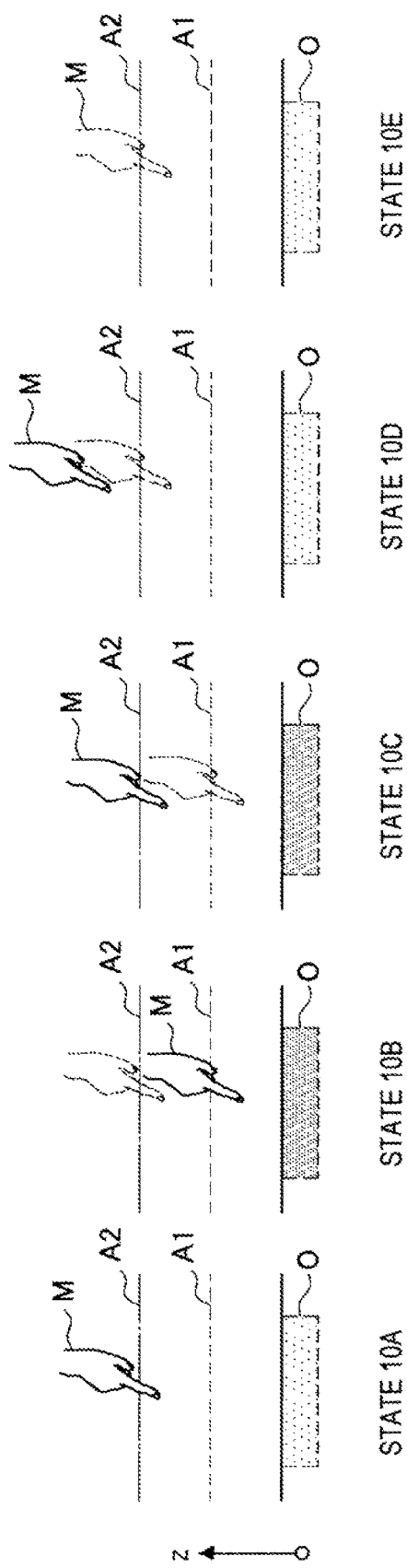

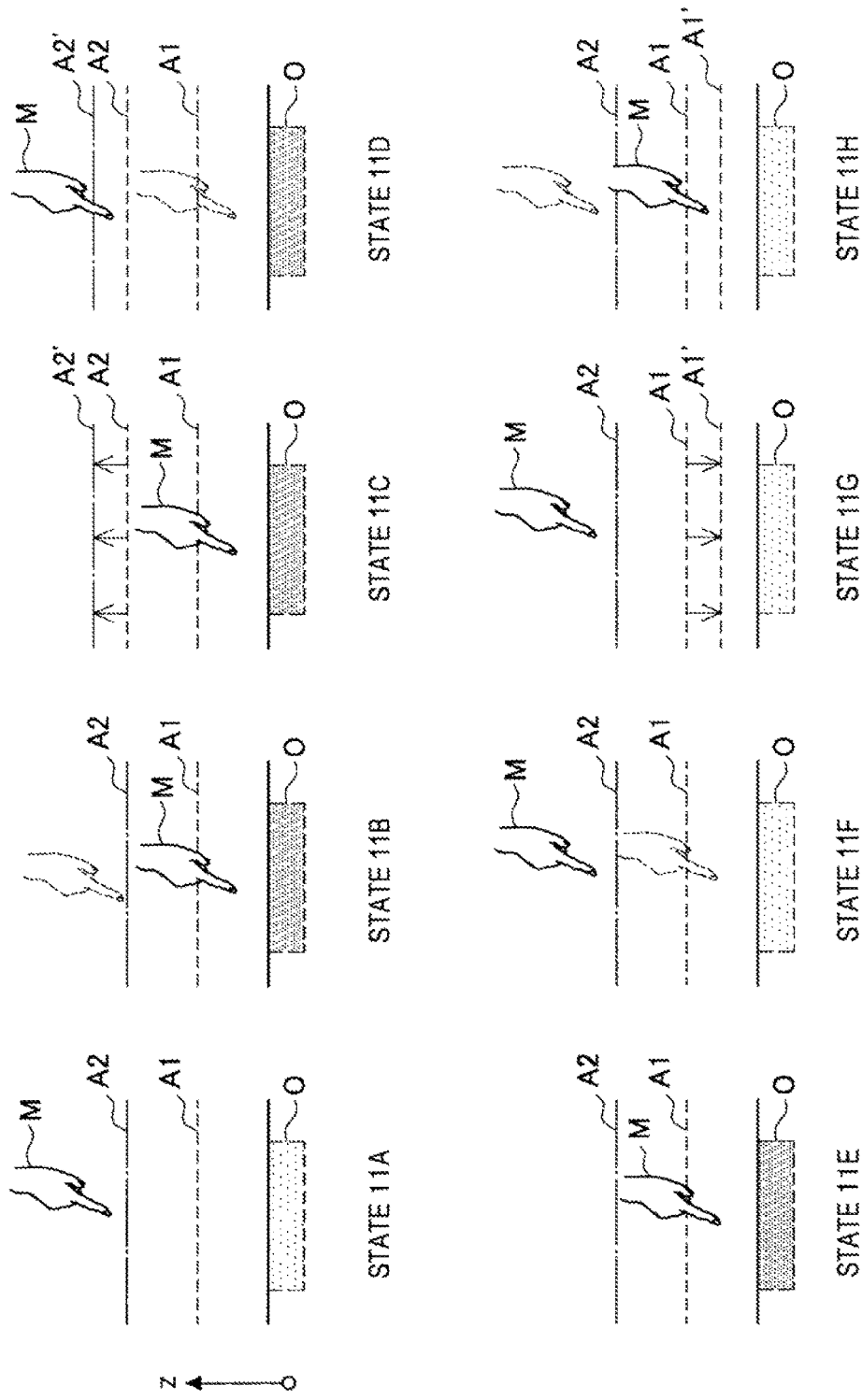

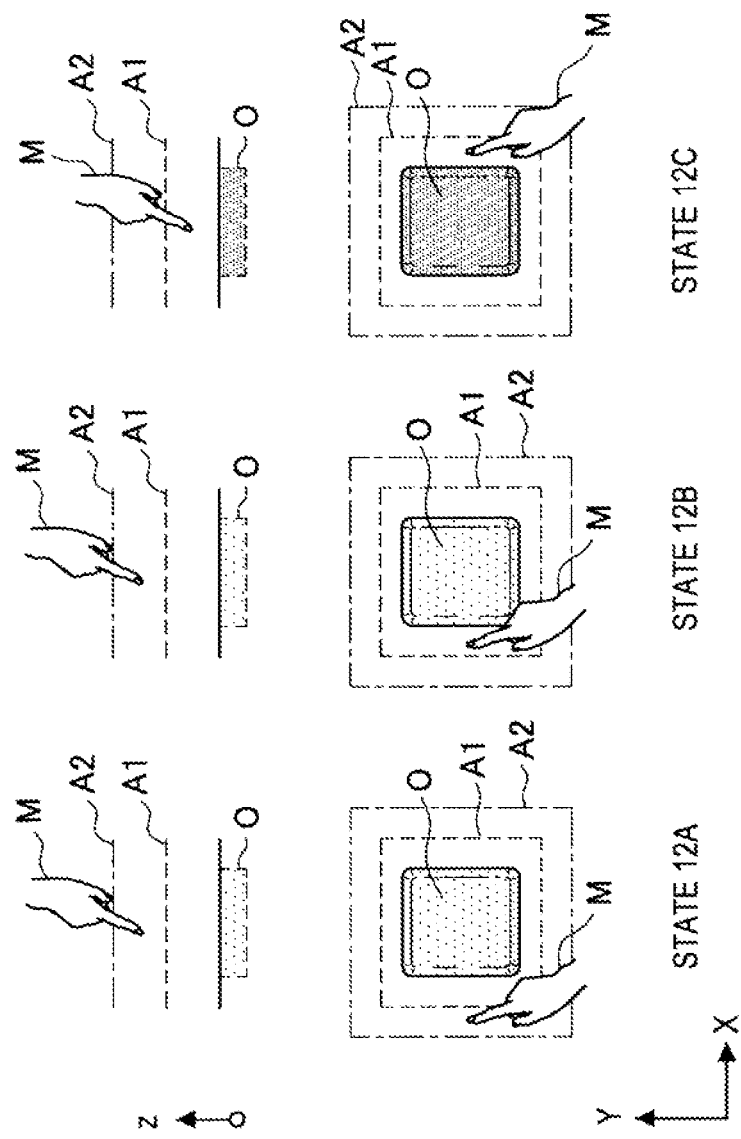

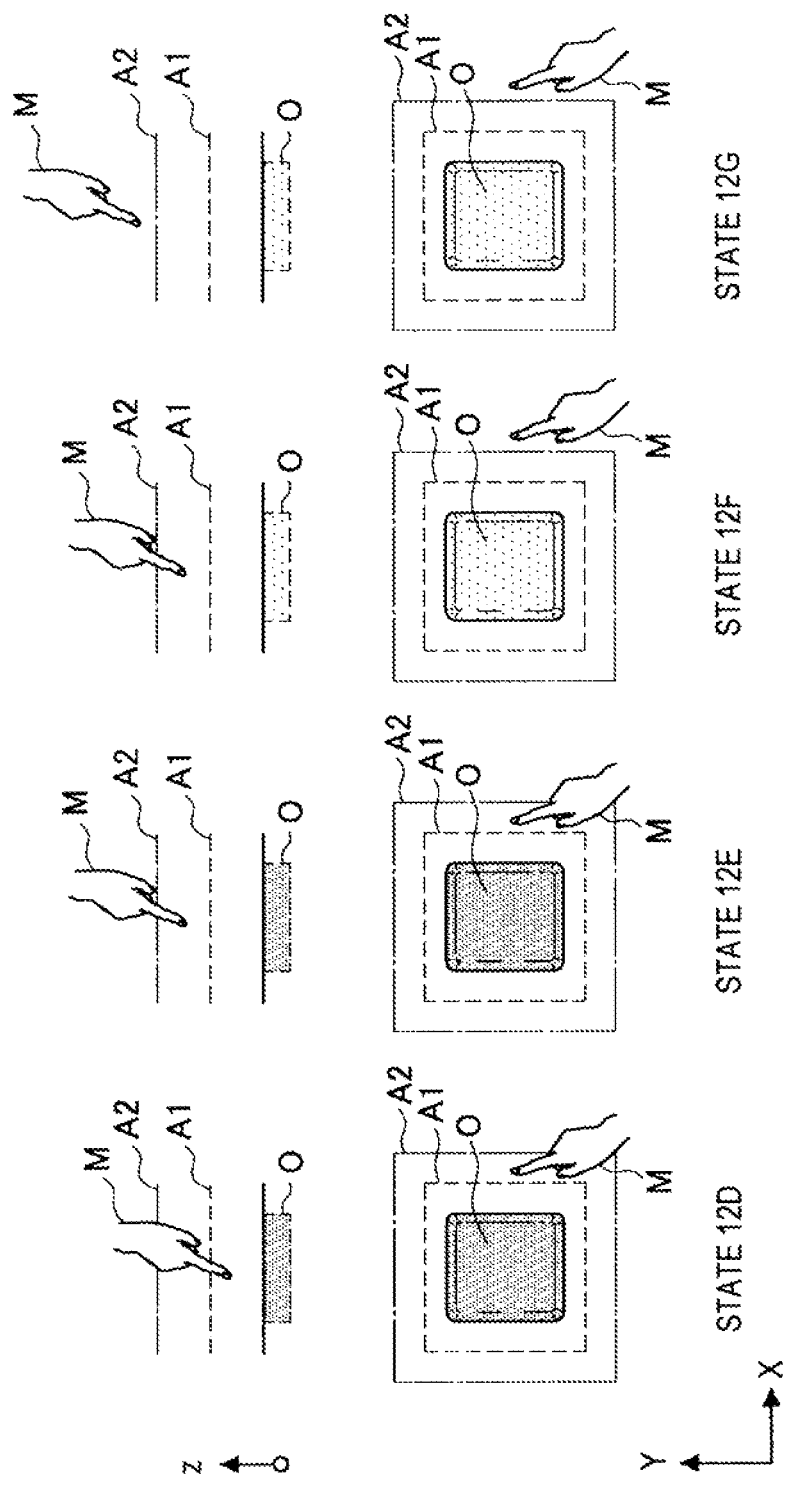

INFORMATION PROCESSING APPARATUS, INFORMATION PROCESSING METHOD, AND PROGRAM

BACKGROUND OF THE INVENTION

Field of the Invention

The present invention relates to an information processing apparatus, an information processing method, and a program.

Description of the Related Art

For a touch panel (display panel) in related art, interaction between a user and a device, such as selection of an object displayed on the touch panel, is performed by detecting a contact state of an operating tool such as a finger or a stylus with the touch panel. Meanwhile, there is known a touch panel which enables interaction between a user and a device by detecting proximity by the operating tool.

SUMMARY OF THE INVENTION

However, typically, in detection of the proximity, the accuracy of detecting the positional information of the operating tool is lower than that for detection of the contact state. Therefore, even though the operating tool is detected inside a detection area set for each object, it is sometimes detected also outside by its slight movement or even though the operating tool is detected outside of the detection area, it is sometimes detected also inside the detection area by its slight movement, which may cause wrong operation. Particularly, when the operating tool detected inside the detection area of an object to be selected is also detected inside the detection area of an object not to be selected, the object not to be selected is changed into a selected state instead of the object to be selected and there may occur wrong operation.

In light of the foregoing, it is desirable to provide an information processing apparatus, an information processing method and a program capable of enhancing the operability of a touch panel for detecting the proximity of an operating tool.

According to a first embodiment of the present invention, there is provided an information processing apparatus including a display panel for displaying at least one object in a selected state or in unselected state, a detection area setting unit for setting, per object on the display panel, a first detection area covering a display area of the object and a second detection area covering the first detection area and being larger than the first detection area, an operating tool detecting unit for detecting an operating tool being in proximity to the display panel and a state managing unit for changing the object into the selected state when the operating tool is detected within the first detection area of the object in the unselected state, and for changing the object into the unselected state when the operating tool is not detected within the second detection area of the object in the selected state.

According to this configuration, the information processing apparatus does not recognize an object in the unselected state as that in the selected state until the operating tool is detected inside the first detection area nor an object in the selected state as that in the unselected state while the operating tool is detected inside the second detection area even though the operating tool is not detected inside the first detection area. This prevents an object not to be selected from being changed into the selected state by mistake and an object to be selected from being changed into the unselected state by mistake. Hence, as the wrong operation due to slight movement of the operating tool is prevented, the operability of the touch panel can be enhanced.

The detection area setting unit may set, per object on the display panel, the first detection area covering the display area of the object in a horizontal direction relative to the display panel and the second detection area covering the first detection area and extending to outside the first detection area in the horizontal direction relative to the display panel. The state managing unit may change the object into the selected state when the operating tool is detected within the first detection area of the object in the unselected state and in proximity to the display panel within a predetermined vertical distance, and may change the object into the unselected state when the operating tool is not detected within the second detection area of the object in the selected state and in proximity to the display panel within a predetermined vertical distance. With this configuration, as the first and second detection areas are set in the horizontal direction with respect to the display panel and the object is set in the selected state or unselected state in accordance with the detection state of the operating tool inside the detection area, it is possible to prevent occurrence of wrong operation due to slight movement of the operating tool in the horizontal direction with respect to the display panel.

The detection area setting unit may set, per object on the display panel, the first detection area covering the display area of the object in a horizontal direction and in a vertical direction relative to the display panel and the second detection area covering the first detection area, extending to outside the first detection area in the horizontal direction relative to the display panel and extending more away from the display panel than the first detection area in the vertical direction relative to the display panel. The state managing unit may change the object into the selected state when the operating tool is detected within the first detection area of the object in the unselected state, and may change the object into the unselected state when the operating tool is not detected within the second detection area of the object in the selected state. With this configuration, as the first and second detection areas are set in the horizontal and vertical directions with respect to the display panel and the object is set in the selected state or unselected state in accordance with the detection state of the operating tool in the detection areas, it is possible to prevent occurrence of wrong operation due to slight movement of the operating tool in the horizontal and vertical directions with respect to the display panel.

The operating tool detecting unit may detect a movement history of the operating tool moving in proximity to the display panel. The detection area setting unit may set, per object on the display panel, the first detection area and/or the second detection area in accordance with the movement history of the operating tool. With this configuration, as the first and second detection areas of the object are set in accordance with the movement history of the operating tool, it is possible to prevent occurrence of wrong operation due to slight movement of the operating tool.

The detection area setting unit may extend the second detection area of the object to an outside of the second detection area in a first direction when the operating tool, moving from an outside of the first detection area of the object to an inside thereof, from the first direction to a second direction, is detected inside of the first detection area. With this configuration, as the user's intension to select the object is estimated from the movement history of the operating tool and the second detection area is extended to the outside of the second detection area in the first direction, it is possible to prevent the object to the selected from being changed to the unselected state by mistake.

The detection area setting unit may reduce the first detection area of the object to an inside of the first detection area in the first direction when the operating tool, moving from the inside of the first detection area of the object to the outside thereof, from the first direction to the second direction, is detected outside the first detection area. With this configuration, as the user's intention not to select the object is estimated from the movement history of the operating tool and the first detection area is reduced into the inside of the first detection area in the first direction, it is possible to prevent the object not to be selected from being changed into the selected state by mistake.

The state managing unit may maintain a selected state of a first object, when the operating tool is detected within an area where the second detection area of the first object in the selected state overlaps the first detection area of second object in an unselected state. With this configuration, as the selection state of the first object is maintained, it is possible to prevent the object to be selected from being changed into the unselected state by mistake.

According to a second embodiment of the present invention, there is provided an information processing method including the steps of displaying at least one object in a selected state or in unselected state on a display panel, setting, per object on the display panel, a first detection area covering a display area of the object and a second detection area covering the first detection area and being larger than the first detection area, detecting an operating tool being in proximity to the display panel and changing the object into the selected state when the operating tool is detected within the first detection area of the object in the unselected state, and changing the object into the unselected state when the operating tool is not detected within the second detection area of the object in the selected state.

According to this method, the object in the unselected state is prevented from being changed into the selected state before the operating tool is detected inside the first detection area and the object in the selected state is prevented from being changed into the unselected state as long as the operating tool is detected in the second detection area even if the operating tool is not selected in the first detection area. This prevents the object not to be selected from being changed into the selected state by mistake and the object to be selected from being changed into the unselected state by mistake. Hence, as the wrong operation due to slight movement of the operating tool is prevented, the operability of the touch panel can be enhanced.

According to a third embodiment of the present invention, there is provided a program for causing a computer to execute the information processing method according to the second embodiment of the present invention.

According to the embodiments of the present invention described above, there can be provided the information processing apparatus, the information processing method and the program which are capable of enhancing the operability of a touch panel for detecting the proximity of an operating tool.

BRIEF DESCRIPTION OF THE DRAWINGS

FIG. 4 illustrates a method for detecting the position of an operating tool;

FIG. 6 is a schematic view illustrating transition of the object state in accordance with the position of the operating tool in the X-Y direction with respect to the touch panel;

FIG. 7 is a schematic view illustrating transition of the object state in accordance with the position of the operating tool moving in the X-Y direction with respect to the touch panel;

FIG. 8 is a schematic view illustrating transition of the states of adjacent objects in accordance with the position of the operating tool moving in the X-Y direction with respect to the touch panel;

FIG. 9 is a schematic view illustrating a method for changing settings of the detection areas in accordance with a movement history of the operating tool moving in the X-Y direction with respect to the touch panel;

FIG. 10 is a schematic view illustrating transition of the object state in accordance with the position of the operating tool moving in the Z direction with respect to the touch panel;

FIG. 11 is a schematic view illustrating a method for changing settings of the detection area in accordance with the movement history of the operating tool moving in the Z direction with respect to the touch panel;

FIG. 12A illustrates transition of the object state in accordance with the position of the operating tool moving in the X-Y, Z directions with respect to the touch panel;

FIG. 12B illustrates transition of the object state in accordance with the position of the operating tool moving in the X-Y, Z directions with respect to the touch panel.

DETAILED DESCRIPTION OF THE EMBODIMENTS

Figure 1:
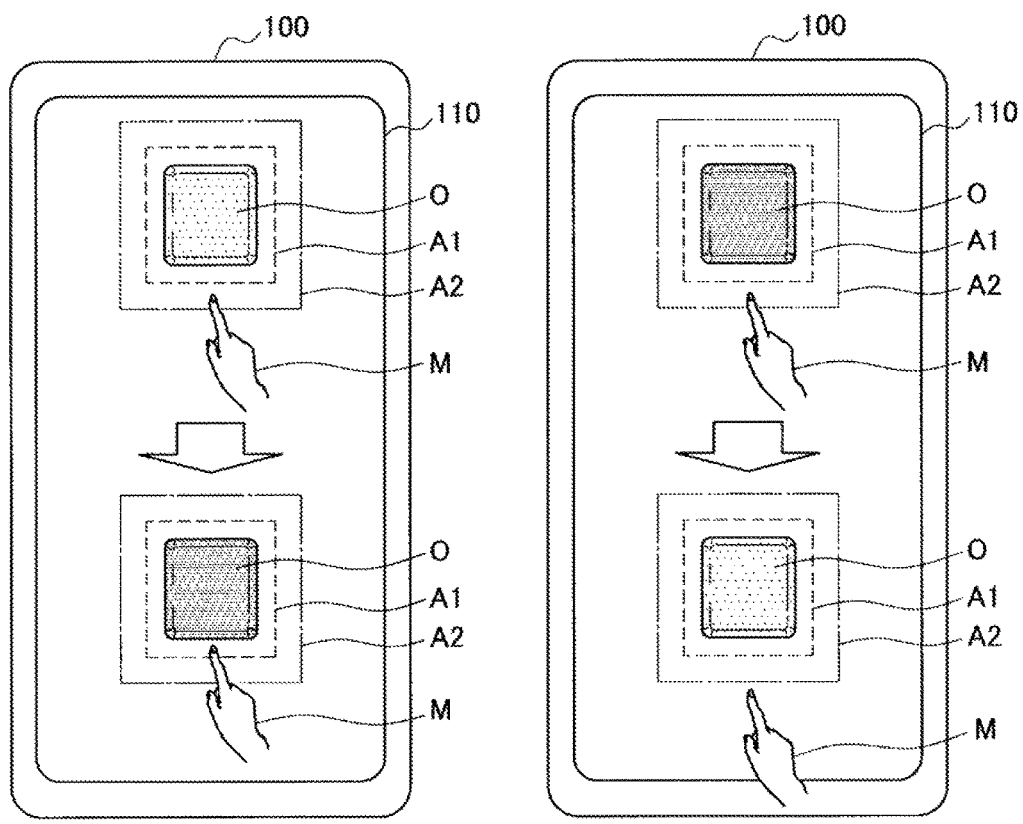
FIG. 1 illustrates an overview of an information processing apparatus according to an embodiment of the invention.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

1. OUTLINE OF INFORMATION PROCESSING APPARATUS 100

FIG. 1 illustrates an overview of an information processing apparatus 100 according to an embodiment of the present invention. As illustrated in FIG. 1, the information processing apparatus 100 according to an embodiment of the present invention has a touch panel (display panel) 110 capable of detecting proximity of an operating tool M such as a finger, a stylus or the like. In the following description, it is assumed that the information processing apparatus 100 is equipped with a built-in touch panel 110. However, the information processing apparatus 100 may be provided with a touch panel 110 which is attached externally thereto via communication means.

The information processing apparatus 100 displays one or more objects O such as icons or the like on the touch panel 110 and sets a detection area A including a display area of the object O on the touch panel 110 for each of the objects O. The information processing apparatus 100 detects the operating tool M in proximity to the touch panel 110 and brings the object O into the selected state or the unselected state in accordance with detection of the operating tool M inside the detection area A of the object O (In the following, the dark and light hatching indicates the object in the selected and unselected state respectively). The objects O include, for example, any objects that constitute graphical user interface such as icons, buttons, thumbnails and the like.

Here, the information processing apparatus 100 sets, together with a detection area A1 covering the display area of the object O, a detection area A2 that covers the detection area A1 and is larger than the detection area A1 on the touch panel 110 for each of the objects O. Then, the information processing apparatus 100, as illustrated in left side view of FIG. 1, brings the object O into the selected state when the operating tool M is detected inside the detection area A1 of the object O in the unselected state (light hatching). Besides, as illustrated in the right side view of FIG. 1, the information processing apparatus 100 brings the object O into the unselected state when the operating tool M is not detected inside the detection area A2 of the object O in the selected state (dark hatching).

Then, the object O in the unselected state is prevented from being changed into the selected state before the operating tool M is detected inside the detection area A1 of the object O, and the object O in the selected state is prevented from being changed into the unselected state as long as the operating tool M is detected inside the detection area A2 even when the operating tool M is not detected inside the detection area A1 of the object O. In other words, it can prevent the object O not to be selected from being changed into the selected state by mistake and the object O to be selected from being changed into the unselected state by mistake. Hence, as the wrong operation is prevented due to slight movement of the operating tool M, the operability of the touch panel 110 can be enhanced.

2. FUNCTIONAL CONFIGURATION OF INFORMATION PROCESSING APPARATUS 100

Figure 2:
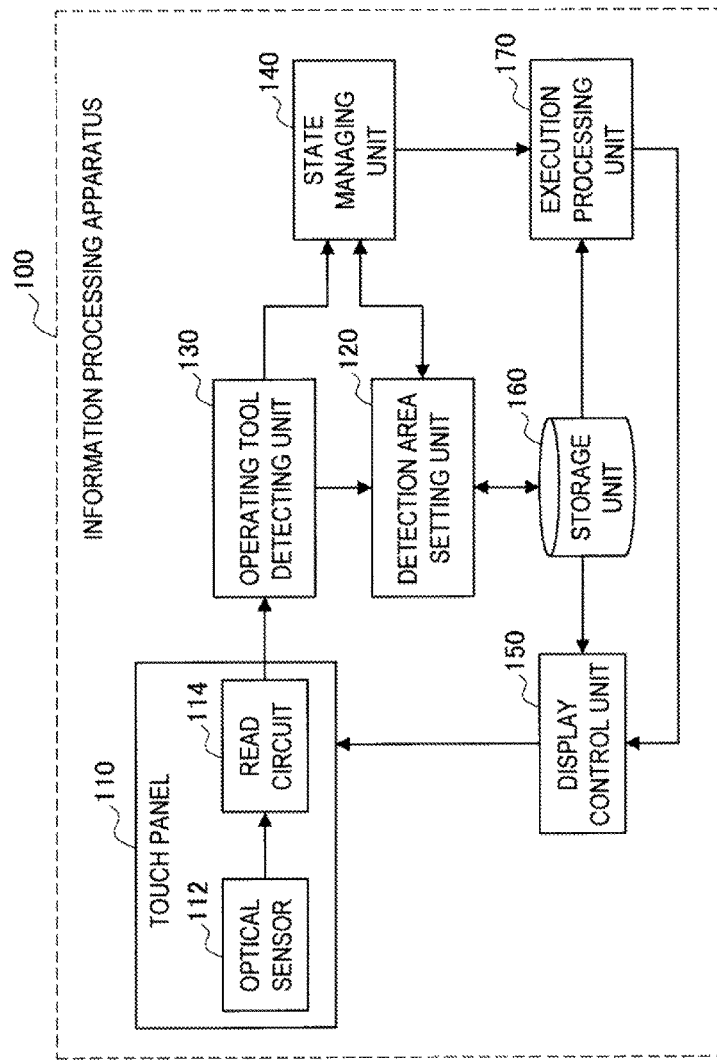
FIG. 2 is a block diagram illustrating an example of functional configuration of the information processing apparatus according to the embodiment of the invention.

FIG. 2 is a view illustrating an example of functional configuration of the information processing apparatus 100 according to the embodiment of the present invention. As illustrated in FIG. 2, the information processing apparatus 100 has a touch panel (display panel) 110, a detection area setting unit 120, an operating tool detecting unit 130, a state managing unit 140, a display control unit 150, a storage unit 160 and an execution processing unit 170.

The touch panel 110 displays an information processing result by the information processing apparatus 100 based on display data supplied from the display control unit 150 and particularly, displays objects O such as icons based on object data and position data. The touch panel 110 detects the operating tool M which is in proximity to or in contact with the touch panel 110.

The touch panel 110 includes an optical sensor 112 and a read circuit 114. The optical sensor 112 detects the intensity of external light incoming to the touch panel 110, and the read circuit 114 reads the intensity of the external light detected by the optical sensor 112 and detects the shadow of the operating tool M. The shadow of the operating tool M is shadow data expressing the position on the touch panel 110 and the shape of the operating tool M. When the operating tool M is in proximity to or in contact with the touch panel 110, the shadow of the operating tool M is projected on the touch panel 110, the projected shadow is read by the read circuit 114 and supplied to the operating tool detecting unit 130 as shadow data.

The detection area setting unit 120 sets a detection area A1 and a detection area A2 on the touch panel 110 for each object O. The detection area A1 is an area covering a display area of the object O, and the detection area A2 is an area which covers the detection area A1 and is larger than the detection area A1. The detection area setting unit 120 uses the position data of the object O stored in the storage unit 160 and a predetermined setting value as a basis to set the detection areas A1 and A2 covering the display area of the object O on the touch panel 110. Here, the setting value is used for setting coverage of the detection areas A1 and A2 in accordance with the display area of the object O.

The detection area A1 is an area extending in the horizontal direction (X-Y direction) relative to the touch panel 110 so as to cover the display area of the object O, which area is set as an area (space) extended in the vertically upward direction (Z direction) relative to the touch panel 110 (which will be described in detail later). Besides, the detection area A2 is set as an area (space) covering the detection area A1 (space) and further extended in the X-Y and/or Z direction.

The operating tool detecting unit 130 detects the operating tool M based on the shadow data supplied from the read circuit 114 and detects the position of the operating tool M in proximity to the touch panel 110. When the operating tool M gets into proximity to the touch panel 110, the shadow of the operating tool M is detected by the read circuit 114 in accordance with the proximity of the operating tool M, and supplied to the operating tool detecting unit 130 as shadow data expressing the position on the touch panel 110 and the shape of the operating tool M. The operating tool detecting unit 130, for example, analyzes the shadow data and detects the specific position of the operating tool M including the tip end of the stylus, finger or the like. The specific position of the operating tool M is supplied to the state managing unit 140 as operating tool position data.

In addition, as described in detail later, setting of the detection area A1 and/or the detection area A2 can be changed in accordance with the movement history of the operating tool M moving over the touch panel 110 in proximity thereto. In this case, the operating tool detecting unit 130 stores the movement history of the operating tool M moving over the touch panel 110, and the detection area setting unit 120 changes the setting of the detection area A1 and/or the detection area A2 based on the movement history of the operating tool M.

The state managing unit 140 changes state data expressing the selected state or unselected state of the object O in accordance with the detection status of the operating tool M in proximity to the touch panel 110. The state managing unit 140 reads area setting data of the detection areas A1 and A2 of each object O from the detection area setting unit 120 and receives the operating tool position data from the operating tool detecting unit 130. The state managing unit 140 uses the state data of the object O stored in advance, the operating tool position data and the area setting data as a basis to specify the object O of which the state data is to be changed, changes the state data of the object O and supplies it to the execution processing unit 170 with an object ID.

When the operating tool M is detected within the detection area A1 of the object O in the unselected state, the state managing unit 140 changes the state data of the object O to the selected state. Besides, when the operating tool M is not detected within the detection area A2 of the object O in the selected state, the state managing unit 140 changes the state data of the object O to the unselected state.

The display control unit 150 controls display of the information processing result by the touch panel 110 and particularly the display of the object O. In order to control the display of the information processing result, the display control unit 150 supplies the display data and the like to the touch panel 110 based on the processing result supplied from the execution processing unit 170. Particularly, in order to control the display of the object O, the display control unit 150 supplies the touch panel 110 with the position data and the object data stored in the storage unit 160.

The storage unit 160 stores object data, position data, entity data for the object O and an execution application for the entity data, in association with the object ID of the object O. The object data is, for example, image data of the object O. The position data is data designating the display position and display area on the touch panel 110 and is updated in accordance with the movement operation when the object O is moved.

The entity data is data for predetermined processing executed when the object O displayed on the touch panel 110 is selected, including image data of the object O and the like. The execution application is a program for executing the predetermined processing of the entity data, including a display program of the image data and the like.

The execution processing unit 170 executes the predetermined processing of the object O based on the object ID and the state data supplied from the state managing unit 140. For example, when the state data of the object O is changed from the unselected state to the selected state, the execution processing unit 170 uses the object ID as a basis to read the entity data and the execution application of the object O from the storage unit 160 and executes the predetermined processing. The execution processing unit 170, for example, processes the image data as entity data with use of the image display application and supplies the processing result to the display control unit 150.

Here, each of the structural components of the information processing apparatus 100 may be configured of a general-purpose member or circuit or hardware for special function of the structural component. Besides, at least a part of the functions of each structural component may be implemented by a program executed on the CPU.

3. OPERATING METHOD OF INFORMATION PROCESSING APPARATUS 100

Next, the operating method of the information processing apparatus 100 will be described with reference to FIGS. 3 to 12.

Figure 3:
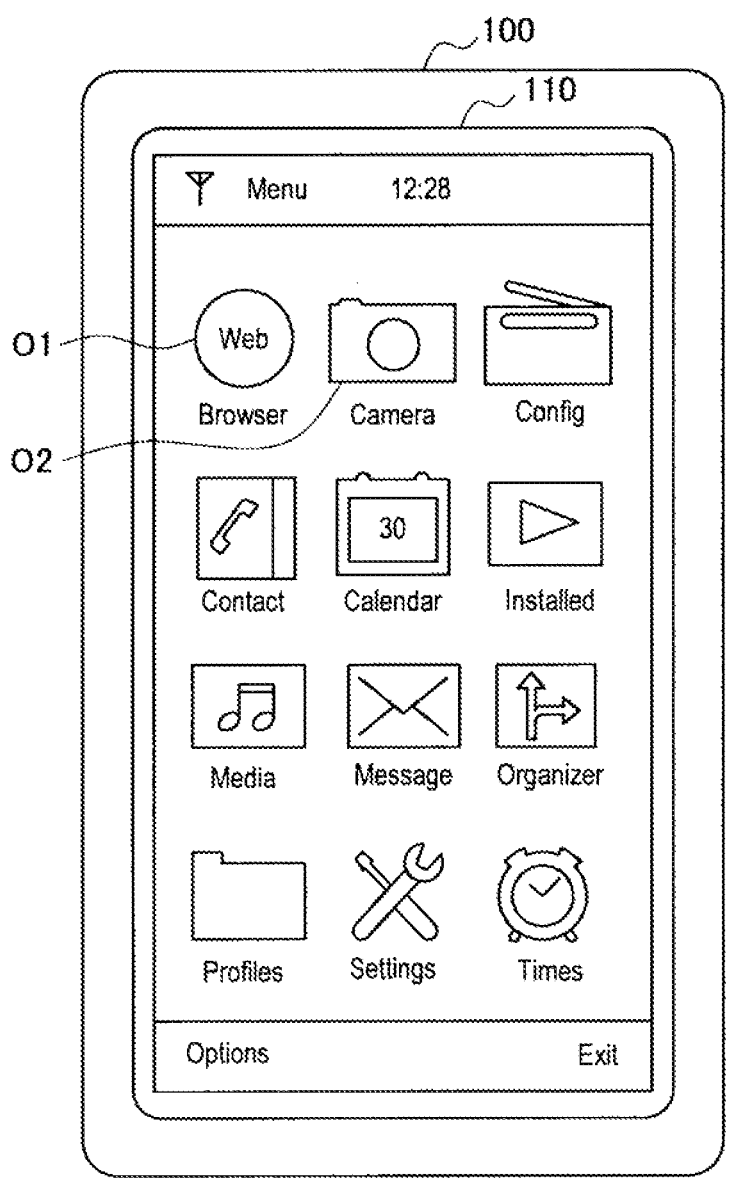
FIG. 3 illustrates an example of an object displayed on a touch panel.

FIG. 3 is a view illustrating an example of objects O displayed on the touch panel 110. As illustrated in FIG. 3, displayed on the touch panel 110 are various objects O including a browser starting icon O1, a camera mode staring icon O2 and the like. The user moves the operating tool M on the touch panel 110 thereby to operate selection or non-selection of the object O. When the selection or non-selection of the object O is operated, the information processing apparatus 100 starts or ends execution of processing of the object O, such as execution of camera program, browser program or the like.

FIG. 4 illustrates the method for detecting the operating tool position. When the operating tool is in proximity to or in contact with the touch panel 110, the information processing apparatus 100 detects the shadow of the operating tool M projected on the touch panel 110 and detects the contact position or proximity position of the operating tool M. In FIG. 4, the pixel coordinate pair of the touch panel 110 is indicated in the horizontal axis and the shadow of the operating tool M detected per pixel is indicated in the vertical axes. As illustrated in FIG. 4, the shadow of the operating tool M such as finger or stylus is dark at the center part Mm of the operating tool M and is light at the contour part Me.

When the operating tool M gets close to the touch panel 110 within a predetermined proximity distance and is not in contact with the touch panel 110, the center part Mm of the operating tool M in proximity to the touch panel 110 is detected by detecting the shadow (solid line) exceeding a predetermined threshold Tha. Further, when the operating tool M is in contact with the touch panel 110, the center part Mm of the operating tool M in contact with the touch panel 110 and the contour part Me of the operating tool M in proximity to the touch panel 110 are detected by detecting the shadow (dotted line) exceeding a threshold Thb which is greater than the threshold Tha. Then, the position of the operating tool M in the X-Y direction is detected from the position of the center part Mm of the operating tool M in the X-Y direction relative to the touch panel 110 and the like, and the position of the operating tool M in the Z direction is detected by darkness or lightness of the shadow so that the position data of the operating tool can be obtained.

Figure 5:
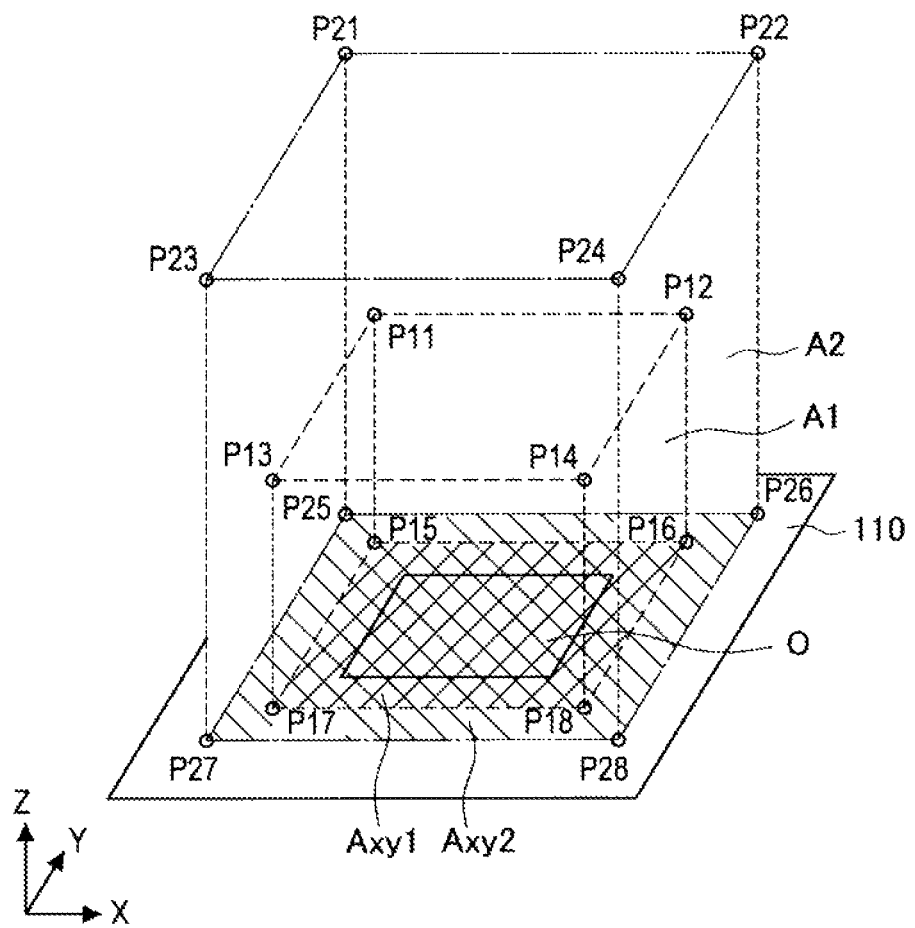
FIG. 5 is a schematic view illustrating a first detection area and a second detection area set for each object.

FIG. 5 is a schematic diagram illustrating the detection areas A1 and A2 set for each object O on the touch panel 110. The detection area A1 is an area covering the display area of the object O, and the detection area A2 is an area covering the detection area A1 and being larger than the detection area A1. As illustrated in FIG. 5, the detection area A1 is an area (space) set by preparing an area Axy1 set in the horizontal direction (X-Y direction) relative to the touch panel 110 so as to cover the display area of the object O and extending the area Axy1 from the touch panel 110 in the vertical direction (Z direction) relative to the touch panel 110. Besides, the detection area A2 is an area (space) set by preparing an area Axy2 covering the detection area A1 and extending to the outside of the detection area A1 in the X-Y direction and extending the area Axy2 more in the Z direction than the detection area A1.

Here, instead of the detection areas (spaces) A1 and A2 set in the horizontal and vertical directions relative to the touch panel 110, the detection areas A1 and A2 may be set only in the horizontal direction. In such a case, the operating tool M positioned within a predetermined vertical distance relative to the touch panel 110 is detected inside or outside of the detection area A1 or inside or outside of the detection area A2.

The detection areas A1 and A2 set for each object O are specified by the area setting data. For example, when the detection areas A1 and A2 are set on the touch panel 110 as square pole shaped areas (spaces), the area setting data is data for specifying each apex of the square pole shaped area. In the example illustrated in FIG. 5, the detection area A1 is specified with data for designating the position on the touch panel 110 P11 to P18 and the detection area A2 is specified with data for designating the position on the touch panel 110 P21 to P28.

FIG. 6 is a schematic diagram illustrating transition of the state of the object O in accordance with the position of the operating tool M in the X-Y direction relative to the touch panel 110. In the following description of FIGS. 6 to 9, it is assumed that the operating tool M moves in the Z direction relative to the touch panel 110, in proximity to the touch panel 110 (for example, within a distance where the shadow of the operating tool M exceeding the threshold Tha illustrated in FIG. 4 is detected), unless otherwise noted.

In the state 6A, the detection area setting unit 120 sets area setting data of the detection areas A1 and A2 for the object O. The state managing unit 140 sets the state data of the object O as the unselected state. The operating tool detecting unit 130 detects the operating tool M outside the detection area A1 and supplies the operating tool position data to the state managing unit 140. The state managing unit 140 reads the area setting data from the detection area setting unit 120 and maintains the state data of the object O as the unselected state based on the operating tool position data and the area setting data.

In the state 6B, when the operating tool M is detected within the detection area A1, the state managing unit 140 changes the state data of the object O from the unselected state to the selected state. In the state 6C, when the operating tool M is detected outside the detection area A1 and within the detection area A2, the state managing unit 140 maintains the state data of the object as the selected state. In the state 6D, when the operating tool M is detected outside the detection area A2, the state managing unit 140 changes the state data of the object O from the selected state to the unselected state. Here, in the state 6E, when the operating tool becomes undetected within the predetermined distance in the Z direction relative to the touch panel 110 in the transition from the state 6A to 6D, the state managing unit 140 maintains the state data of the object O as the unselected state or changes the state data from the selected state to the unselected state.

When the state managing unit 140 changes the state data of the object O, it notifies the execution processing unit 170 of change of the state data and the object ID. The execution processing unit 170 starts or ends execution of the predetermined processing for the object O in accordance with the state data.

FIG. 7 is a schematic diagram illustrating transition for the state of the object O in accordance with the position of the operating tool M moving in the X-Y direction relative to the touch panel 110.

The processing in the state 7A is the same as that in the state 6A illustrated in FIG. 6. In the state 7B, when the operating tool M moving from the outside of the detection area A1 to the inside of the detection area A1 is detected, the state managing unit 140 changes the state data of the object O from the unselected state to the selected state. In the state 7C, when the operating tool M moving from the inside of the detection area A1 to the outside of the detection area A1 and inside of the detection area A2 is detected, the state managing unit 140 maintains the state data of the object O as the selected state. In the state 7D, the operating tool M moving from the outside of the detection area A1 and the inside of the detection area A2 to the outside of the detection area A2 is detected, the state managing unit 140 changes the state data of the object O from the selected state to the unselected state. Here, the processing in the state 7E is the same as that in the state 6E illustrated in FIG. 6.

FIG. 8 is a schematic diagram illustrating transition of the state of the objects Oa and Ob adjacent to each other in accordance with the position of the operating tool M moving in the X-Y direction relative to the touch panel 110.

In the state 8A, the detection area setting unit 120 sets area setting data of detection areas A1a, A2a, A1b and A2b for the objects Oa and Ob. The state managing unit 140 has the state data of the objects Oa and Ob set as the unselected state. Here, the detection area A2a of the object Oa covers an overlapping area Ao that overlaps the detection area A1b of the object Ob. The operating tool detecting unit 130 detects the operating tool M outsides the detection areas A1a and A1b of the objects Oa and Ob and supplies the operating tool position data to the state managing unit 140. The state managing unit 140 reads the area setting data from the detection area setting unit 120 and maintains the state data of the objects Oa and Ob as the unselected state based on the area setting data and the operating tool position data.

In the state 8B, when the operating tool M is detected within the detection area A1a of the object Oa, the state managing unit 140 changes the state data of the object Oa from the unselected state to the selected state. In the state 8C, when the operating tool M is detected in the overlapping area Ao contained in the detection area A2a of the object Oa, the state managing unit 140 maintains the state data of the object Oa as the selected state.

In the state RD, when the operating tool M is detected outside the detection area A2a of the object Oa and within the detection area A1b of the object Ob, the state managing unit 140 changes the state data of the object Oa from the selected state to the unselected state and the state data of the object Ob from the unselected state to the selected state. In the state 8E, when the operating tool M is detected outside the detection area A1b and within the detection area A2b of the object Ob, the state managing unit 140 maintains the state data of the object Ob as the selected state. In the state 8F, when the operating tool M is detected outside the detection area A2b of the object Ob, the state managing unit 140 changes the state data of the object Ob from the selected state to the unselected state.

FIG. 9 is a schematic diagram illustrating a method for changing setting of the detection areas A1 and A2 in accordance with the movement history of the operating tool M moving in the X-Y direction relative to the touch panel 110.

The processing in the state 9A is the same as that in the state 6A illustrated in FIG. 6 except that the operating tool M is detected outside the detection area A2. In the state 913, when the operating tool M is moved in the right direction relative to the object O, the operating tool detecting unit 130 holds the movement history of the operating tool M. When the operating tool moving from the outside of the detection area A2 to the inside of the detection area A1, the state managing unit 140 changes the state data of the object O from the unselected state to the selected state and notifies the detection area setting unit 120 of change in state data. The detection area setting unit 120 reads the movement history from the operating tool detecting unit 130 and confirms that the state data of the object O is changed from the unselected state to the selected state by the operating tool M moving in the right direction relative to the object O.

Then, as illustrated in the state 9C, the detection area setting unit 120 extends the detection area A2 to the left side of the object O that is a direction where the operating tool M gets close to the object O. Then, as illustrated, in the state 9D, even when the operating tool M is slightly moved in the left direction, the object O can be prevented from being changed to the unselected state as long as the operating tool M is detected within the extended detection area A2'.

The processing in the state 9E is the same as that in the state 6A illustrated in FIG. 6 except that the state data of the object O is set to be the selected state and the operating tool M is detection within the detection area A1. In the state 9F, when the operating tool M is moved in the right direction relative to the object O, the operating tool detecting unit 130 holds the movement history of the operating tool M. When the operating tool M moving from the inside of the detection area A1 to the outside of the detection area A2 is detected, the state managing unit 140 changes the state data of the object O from the selected state to the unselected state. The detection area setting unit 120 confirms, based on the movement history of the operating tool M, that the state data of the object O is changed from the selected state to the unselected state by the operating tool M that has moved in the right direction relative to the object O.

Then, as illustrated in the state 9G, at the right side of the object O which is a direction where the operating tool M gets away from the object O, the detection area setting unit 120 reduces the detection area A1 to the left side of the object O. Then, as illustrated in the state 9H, even when the operating tool M is slightly moved in the left direction, the object O is prevented from being changed to the selected state as long as the operating tool M is detected outside the reduced detection area A1'.

FIG. 10 is a schematic diagram illustrating transition of the state of the object O in accordance with the position of the operating tool M moving in the Z direction relative to the touch panel 110. In the description of FIGS. 10 to 12, it is assumed that the operating tool M is moved within the detection areas A1 and A2 of the object O in the X-Y direction relative to the touch panel 110, unless otherwise noted.

In the state 10A, the detection area setting unit 120 sets the area setting data of the detection areas A1 and A2 of the object O. The state managing unit 140 sets the state data of the object O to the unselected state. The operating tool detecting unit 130 detects the operating tool M outside the detection area A1 of the object O and supplies the operating tool position data to the state managing unit 140. The state managing unit 140 reads the area setting data from the detection area setting unit 120 and maintains the state data of the object O as the unselected state based on the operating tool position data and the area setting data.

In the state 10B, when the operating tool M is detected within the detection area A1, the state managing unit 140 changes the state data of the object O from the unselected state to the selected state. In the state 10C, when the operating tool M is detected outside the detection area A1 and within the detection area A2, the state managing unit 140 maintains the state data of the object O as the selected state. In the state 10D, when the operating tool M is detected outside the detection area A2, the state managing unit 140 changes the state data of the object O from the selected state to the unselected state. Here, if, in the state 10E, the operating tool is not detected within the detection areas A1 and A2 of the object O in the X-Y direction relative to the touch panel 110 during transition from the state 10A to the state 10D, the state managing unit 140 maintains the state data of the object O as the unselected state or changes the state data from the selected state to the unselected state.

FIG. 11 is a schematic diagram illustrating a method for changing setting of the detection areas A1 and A2 in accordance with the movement history of the operating tool M moving in the Z direction relative to the touch panel 110.

The processing in the state 11A is the same as that in the state 10A illustrated in FIG. 10 except that the operating tool M is detected outside the detection area A2. In the state 11B, when the operating tool M is moved in the Z direction relative to the touch panel 110 and in the direction where the operating tool M gets close to the touch panel 110, the operating tool detecting unit 130 holds the movement history of the operating tool M. When the operating tool M moving from the outside of the detection area A2 to the inside of the detection area A1 is detected, the state managing unit 140 changes the state data of the object O from the unselected state to the selected state and notifies the detection area setting unit 120 of change in state data. The detection area setting unit 120 reads the movement history from the operating tool detecting unit 130 and confirms that the state data of the object O is changed from the unselected state to the selected state by the operating tool M that has moved in the direction where the operating tool M gets close to the touch panel 110.

Then, as illustrated in the state 11C, the detection area setting unit 120 extends the detection area A2 to the upper side of the touch panel 110. Then, as illustrated in the state 11D, even when the operating tool M is slightly moved upward, the object O can be prevented from being changed into the unselected state as long as the operating tool M is detected within the extended detection area A2'.

The processing in the state 11E is the same as that in the state 10A illustrated in FIG. 10 except that the state data of the object O is set to the selected state and operating tool M is detected within the detection area A1. In the state 11F, the operating tool M is moved in the Z direction relative to the touch panel 110 and in the direction where the operating tool M gets away from the touch panel 110, the operating tool detecting unit 130 holds the movement history of the operating tool M. When the operating tool M moving from the inside of the detection area A1 to the outside of the detection area A2 is detected, the state managing unit 140 changes the state data of the object O from the selected state to the unselected state. The detection area setting unit 120 uses the movement history of the operating tool M as a basis to confirm that the state data of the object O is changed from the selected state to the unselected state by the operating tool M moving in the direction where the operating tool M gets away from the touch panel 110.

Then, as illustrated in the state 11G, the detection area setting unit 120 reduces the detection area A1 to the lower side of the touch panel 110. Then, as illustrated in the state 11H, even when the operating tool M is moved slightly in the lower direction, the object can be prevented from being changed into the selected state unless the operating tool M is detected within the reduced detection area A1'.

FIGS. 12A and 12B illustrate transition of the state of the object O in accordance with the position of the operating tool M moving in the X-Y and Z directions relative to the touch panel 110.

The processing in the state 12A is the same as that in the state 10A illustrated in FIG. 10. Here, the operating tool detecting unit 130 detects the operating tool M outside the detection area A1 in the X-Y and Z directions. In the state 12B, when the operating tool M is detected within the detection area A1 in the X-Y direction and outside the detection area A1 in the Z direction, the state managing unit 140 maintains the state data of the object O as the unselected state. Here, the same goes for the case where the operating tool M is detected outside the detection area A1 in the X-Y direction and within the detection area A1 in the Z direction.

In the state 12C, when the operating tool M is detected within the detection area A1 in the X-Y and Z directions, the state managing unit 140 changes the state data of the object O from the unselected state to the selected state. In the state 12D, where the operating tool M is detected outside the detection area A1 and within the detection area A2 in the X-Y direction and within the detection area A1 in the Z direction, the state managing unit 140 maintains the state data of the object O as the selected sate. Here, the same goes for the case where the operating tool M is detected within the detection area A1 in the X-Y direction and outside the detection area A1 and within the detection area A2 in the Z direction. In the state 12E, when the operating tool M is detected outside the detection area A1 and within the detection area A2 in the X-Y and Z directions, the state managing unit 140 maintains the state data of the object O as the selected state.

In the state 12F, when the operating tool M is detected outside the detection area A2 in the X-Y direction and outside the detection area A1 and within the detection area A2 in the Z direction, the state managing unit 140 changes the state data of the object O from the selected state to the unselected state. Here, the same goes for the case where the operating tool M is detected outside the detection area A1 and within the detection area A2 in the X-Y direction and outside the detection area A2 in the Z direction. In the state 12G, when the operating tool M is detected outside the detection area A2 in the X-Y and Z directions, the state managing unit 140 maintains the state data of the object O as the unselected state.

4. HARDWARE CONFIGURATION OF INFORMATION PROCESSING APPARATUS 100

Figure 13:
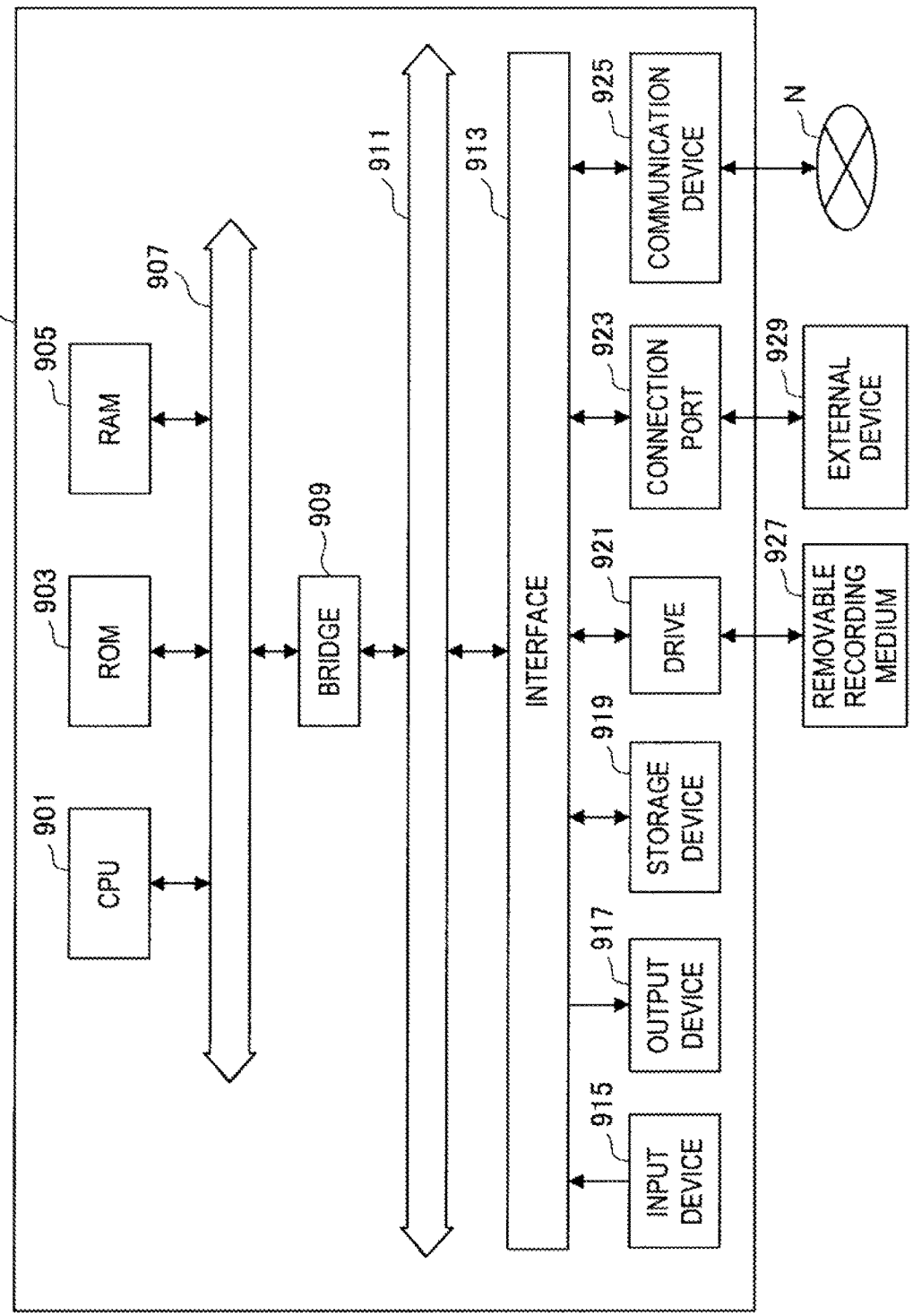
FIG. 13 is a block diagram illustrating an example of hardware configuration of the information processing apparatus.

FIG. 13 is a block diagram illustrating an example of hardware configuration of the information processing apparatus 100.

The information processing apparatus 100 includes, mainly, a CPU 901, a ROM 903, a RAM 905, a host bus 907, a bridge 909, an external bus 911, an interface 913, an input device 915, an output device 917, a storage device 919, a drive 921, a connection port 923 and a communication device 925.

The CPU 901 functions as an arithmetic processing device and a controlling device and is configured to control the operation of the information processing apparatus 100 at least partially, in accordance with various programs stored in a removable recording medium 927, the storage device 919, the RAM 905 or the ROM 903. The ROM 903 stores parameters, programs used in the CPU 901 and the like. The RAM 905 temporarily stores parameters for execution of the programs and the like by the CPU 901. The CPU 901, the ROM 903 and the RAM 905 are connected to each other via the host bus 907. The host bus 907 is connected to the external bus 911 via the bridge 909.

The input device 915 is an operating means operable by a user, including a mouse, a keyboard, a touch panel 110, a button, a switch and the like. The input device 915 may be, for example, a remote operating means using electric wave such as infrared ray or an external device 929 such as a portable phone, a PDA or the like for operating the information processing apparatus 100. The input device 915 includes, for example, an input control circuit for generating an input signal based on operation information input by a user using the operating means as mentioned above and outputting the signal to the CPU 901. The user of the information processing apparatus 100 operates the input device 915 to input various data for the information processing apparatus 100 and gives instructions of processing operations.

The output device 917 includes a display device such as a CRT display, a liquid crystal display, a lamp or the like, a sound output device such as a speaker, a headphone or the like and a device that can send obtained information to users visually or acoustically such as a printer, a portable phone, a facsimile or the like. The output device 917 outputs processing results of the information processing apparatus 100. For example, the display device displays the processing results of the information processing apparatus 100 as text information or image information, and the sound output device converts audio signals such as played acoustic data, sound data and the like into analogue signals to output them.

The storage device 919 is a device for storing data and includes a magnetic storage device such as a HDD, a semiconductor storage device, an optical storage device, a magneto-optical storage device and the like. The storage device 919 stores programs executed by the CPU 901, various data, data obtained from the outside and the like.

The drive 921 is a reader/writer for recording medium and is mounted on the information processing apparatus 100 integrally or externally. The driver 921 is configured to read recorded data from the inserted removable recording medium 927 such as magnetic disk, an optical disk, a magneto-optical disk, a semiconductor memory or the like, output the recorded data to the RAM 905 and write the data to read.

The connection port 923 is a port for connecting the external device 929 directly to the information processing apparatus 100, such as a USB port, a SCSI port, an RS232C port or the like. The information processing device 100 obtains data via the connection port 923 from the external device 929 connected to the connection port 923 and provides data to the external device 929.

The communication device 925 is a communication interface 913 having a communication device or the like for connecting to the communication network N. The communication device 925 is, for example, a wire or wireless LAN, a WUSB communication card, an ADSL router, a communication modem or the like. The communication device 925 is configured to perform transmission and reception of signals or the like in accordance with a predetermined protocol, for example, with Internet or other communication equipment. The communication network N connected to the communication apparatus 925 is network connected with a cable or wirelessly or the like and includes Internet, home LAN, infrared data communication, radio wave communication, satellite communication and the like.

Up to this point, the hardware configuration for implementing the functions of the information processing apparatus 100 according to the present embodiment of the present invention has been described by way of example. Each structural component of the hardware may be configured of a general-purpose device or device tailored to specific functions of the structural component.

5. CONCLUSION

As described up to this point, according to the information processing apparatus 100 according to the present embodiment, the object O in the unselected state is prevented from being changed to the selected state before the operating tool M is detected within the detection area A1, and the object O in the selected state O is prevented from being changed to the unselected state as long as the operating tool M is detected within the detection area A2 even if the operating tool M is not detected within the detection area A1. This prevents the object O not to be selected from being into the selected state by mistake, and the object O to select from being changed into the unselected state by mistake. Therefore, as the wrong operation is prevented due to slight movement of the operating tool M, the operability of the touch panel 110 can be enhanced.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-68620 filed in the Japan Patent Office on Mar. 19, 2009, the entire content of which is hereby incorporated by reference.

What is claimed is:

1. An information processing apparatus, comprising:
    a display panel configured to display at least one object in a selected state or in unselected state;
    a detection area setting unit configured to set, per object on the display panel, a first detection area covering a display area of the object and a second detection area covering the first detection area and being larger than the first detection area;
    an operating tool detecting unit configured to detect an operating tool being in proximity to the display panel; and
    a state managing unit configured to change the object into the selected state when the operating tool is detected within the first detection area of the object in the unselected state, and configured to change the object into the unselected state when the operating tool is not detected within the second detection area of the object in the selected state,
    wherein the operating tool detecting unit detects a movement history of the operating tool moving in proximity to the display panel, and
    the detection area setting unit sets, per object on the display panel, the first detection area and the second detection area in accordance with the movement history of the operating tool,
    wherein the detection area setting unit, the operating tool detecting unit, and the state managing unit are each implemented via at least one processor.

2. The information processing apparatus according to claim 1, wherein
    the detection area setting unit sets, per object on the display panel, the first detection area covering the display area of the object in a horizontal direction relative to the display panel and the second detection area covering the first detection area and extending to outside the first detection area in the horizontal direction relative to the display panel, and
    the state managing unit changes the object into the selected state when the operating tool is detected within the first detection area of the object in the unselected state and in proximity to the display panel within a predetermined vertical distance, and changes the object into the unselected state when the operating tool is not detected within the second detection area of the object in the selected state and in proximity to the display panel within a predetermined vertical distance.

3. The information processing apparatus according to claim 2, wherein the state managing unit maintains a selected state of the first object, when the operating tool is detected within an area where the second detection area of the first object in the selected state overlaps the first detection area of a second object in an unselected state.

4. The information processing apparatus according to claim 1, wherein
    the detection area setting unit sets, per object on the display panel, the first detection area covering the display area of the object in a horizontal direction and in a vertical direction relative to the display panel and the second detection area covering the first detection area, extending to outside the first detection area in the horizontal direction relative to the display panel and extending more away from the display panel than the first detection area in the vertical direction relative to the display panel, and
    the state managing unit changes the object into the selected state when the operating tool is detected within the first detection area of the object in the unselected state, and changes the object into the unselected state when the operating tool is not detected within the second detection area of the object in the selected state.

5. The information processing apparatus according to claim 1, wherein
    the state managing unit changes the object into the selected state when the operating tool is detected to move from outside of the second detection area to the inside of the first detection area of the object in the unselected state, and
    the detection area setting unit determines from the movement history of the operating tool that the state of the object changed from the unselected sate to the selected state by the operating tool moving in a first direction, and extends the second detection area of the object in an opposite direction of the first direction.

6. The information processing apparatus according to claim 1, wherein
    the state managing unit changes the object into the unselected state when the operating tool is detected to move from inside the first detection area to the outside of the second detection area of the object in the selected state, and
    the detection area setting unit determines from the movement history of the operating tool that the state of the object changed from the selected state to the unselected state by the operating tool moving in a first direction, and reduces the first detection area of the object in an opposite direction of the first direction.

7. An information processing method, implemented via at least one processor, the method comprising:
    displaying at least one object in a selected state or in unselected state on a display panel;
    setting, per object on the display panel, a first detection area covering a display area of the object and a second detection area covering the first detection area and being larger than the first detection area;
    detecting an operating tool being in proximity to the display panel; and
    changing the object into the selected state when the operating tool is detected within the first detection area of the object in the unselected state, and changing the object into the unselected state when the operating tool is not detected within the second detection area of the object in the selected state,
    detecting a movement history of the operating tool moving in proximity to the display panel, and setting the first detection area and the second detection area in accordance with the movement history of the operating tool.

8. The information processing method according to claim 7, wherein
said setting of the first detection area and the second detection area comprises setting, per object on the display panel, the first detection area covering the display area of the object in a horizontal direction relative to the display panel and the second detection area covering the first detection area and extending to outside the first detection area in the horizontal direction relative to the display panel, and
said changing comprises changing the object into the selected state when the operating tool is detected within the first detection area of the object in the unselected state and in proximity to the display panel within a predetermined vertical distance, and changes the object into the unselected state when the operating tool is not detected within the second detection area of the object in the selected state and in proximity to the display panel within a predetermined vertical distance.

9. The information processing method according to claim 8, wherein a selected state of the first object is maintained, when the operating tool is detected within an area where the second detection area of the first object in the selected state overlaps the first detection area of a second object in an unselected state.

10. The information processing method according to claim 7, wherein
said setting the first detection area and the second detection area comprises setting, per object on the display panel, the first detection area covering the display area of the object in a horizontal direction and in a vertical direction relative to the display panel and the second detection area covering the first detection area, extending to outside the first detection area in the horizontal direction relative to the display panel and extending more away from the display panel than the first detection area in the vertical direction relative to the display panel, and
said changing comprises changing the object into the selected state when the operating tool is detected within the first detection area of the object in the unselected state, and changes the object into the unselected state when the operating tool is not detected within the second detection area of the object in the selected state.

11. The information processing method according to claim 7, wherein
the object is changed into the selected state when the operating tool is detected to move from outside of the second detection area to the inside of the first detection area of the object in the unselected state, and
the state of the object is determined, from the movement history of the operating tool, to have changed from the unselected state to the selected state by the operating tool moving in a first direction, and the second detection area of the object is extended in an opposite direction of the first direction.

12. The information processing method according to claim 7, wherein
the object is changed into the unselected state when the operating tool is detected to move from inside the first detection area to the outside of the second detection area of the object in the selected state, and
the state of the object is determined, from the movement history of the operating tool, to have changed from the selected state to the unselected state by the operating tool moving in a first direction, and the first detection area of the object is reduced in an opposite direction of the first direction.

13. A non-transitory computer-readable medium having embodied thereon a program, which when executed by a processor of a computer causes the processor to perform a method, the method comprising:
displaying at least one object in a selected state or in unselected state on a display panel;
setting, per object on the display panel, a first detection area covering a display area of the object and a second detection area covering the first detection area and being larger than the first detection area;
detecting an operating tool being in proximity to the display panel; and
changing the object into the selected state when the operating tool is detected within the first detection area of the object in the unselected state, and changing the object into the unselected state when the operating tool is not detected within the second detection area of the object in the selected state,
detecting a movement history of the operating tool moving in proximity to the display panel, and
setting the first detection area and the second detection area in accordance with the movement history of the operating tool.

14. The non-transitory computer-readable medium according to claim 13, wherein
said setting of the first detection area and the second detection area comprises setting, per object on the display panel, the first detection area covering the display area of the object in a horizontal direction relative to the display panel and the second detection area covering the first detection area and extending to outside the first detection area in the horizontal direction relative to the display panel, and
said changing comprises changing the object into the selected state when the operating tool is detected within the first detection area of the object in the unselected state and in proximity to the display panel within a predetermined vertical distance, and changes the object into the unselected state when the operating tool is not detected within the second detection area of the object in the selected state and in proximity to the display panel within a predetermined vertical distance.

15. The non-transitory computer-readable medium according to claim 14, wherein a selected state of the first object is maintained, when the operating tool is detected within an area where the second detection area of the first object in the selected state overlaps the first detection area of a second object in an unselected state.

16. The non-transitory computer-readable medium according to claim 13, wherein
said setting the first detection area and the second detection area comprises setting, per object on the display panel, the first detection area covering the display area of the object in a horizontal direction and in a vertical direction relative to the display panel and the second detection area covering the first detection area, extending to outside the first detection area in the horizontal direction relative to the display panel and extending more away from the display panel than the first detection area in the vertical direction relative to the display panel, and
said changing comprises changing the object into the selected state when the operating tool is detected within the first detection area of the object in the unselected state, and changes the object into the unselected state when the operating tool is not detected within the second detection area of the object in the selected state.

17. The non-transitory computer-readable medium according to claim 13, wherein the object is changed into the selected state when the operating tool is detected to move from outside of the second detection area to the inside of the first detection area of the object in the unselected state, and the state of the object is determined, from the movement history of the operating tool, to have changed from the unselected state to the selected state by the operating tool moving in a first direction, and the second detection area of the object is extended in an opposite direction of the first direction.

18. The non-transitory computer-readable medium according to claim 13, wherein the object is changed into the unselected state when the operating tool is detected to move from inside the first detection area to the outside of the second detection area of the object in the selected state, and the state of the object is determined, from the movement history of the operating tool, to have changed from the selected state to the unselected state by the operating tool moving in a first direction, and the first detection area of the object is reduced in an opposite direction of the first direction.

* * * * *